United States Patent
Shimizu et al.

(10) Patent No.: US 7,543,769 B2
(45) Date of Patent: Jun. 9, 2009

(54) BLASTING MEDIUM PICKING-APART DEVICE

(75) Inventors: Tokuo Shimizu, Tokyo (JP); Tetsunori Yano, Tokyo (JP); Naoki Okamoto, Kumamoto (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 92 days.

(21) Appl. No.: 11/687,730

(22) Filed: Mar. 19, 2007

(65) Prior Publication Data

US 2007/0218816 A1    Sep. 20, 2007

(30) Foreign Application Priority Data

Mar. 17, 2006    (JP) .............................. 2006-074259

(51) Int. Cl.
   *B02C 18/12*    (2006.01)
(52) U.S. Cl. ...................... 241/37; 241/152.2; 241/248; 241/259.1
(58) Field of Classification Search ................. 241/248, 241/257.1, 259.1, 282.1, 282.2, 277, 278.1, 241/37, 152.2
   See application file for complete search history.

(56) References Cited

U.S. PATENT DOCUMENTS

| 2,696,910 | A |   | 12/1954 | Ljungdell et al. |          |
|-----------|---|---|---------|------------------|----------|
| 2,952,288 | A | * | 9/1960  | Schnell          | 241/56   |
| 3,429,350 | A | * | 2/1969  | Otto             | 241/257.1|
| 4,140,282 | A | * | 2/1979  | Steimel          | 241/36   |
| 4,171,103 | A | * | 10/1979 | Rossler          | 241/152.2|
| 4,187,992 | A | * | 2/1980  | Del Valle        | 241/65   |

FOREIGN PATENT DOCUMENTS

| DE | 4219090      | * | 12/1993 |
|----|--------------|---|---------|
| EP | 0099561      | * | 7/1983  |
| GB | 2 365 803 A  |   | 2/2002  |
| JP | 9-109029 A   |   | 4/1997  |
| JP | 2002-28466 A |   | 1/2002  |

OTHER PUBLICATIONS

Singapore Search and Examination Report dated Jul. 18, 2008.

* cited by examiner

*Primary Examiner*—Mark Rosenbaum
(74) *Attorney, Agent, or Firm*—David S. Safran; Roberts Mlotkowski Safran & Cole, P.C.

(57) ABSTRACT

The present invention provides a blasting medium picking-apart device comprising: a hopper-shaped container having an upper opening through which a blasting medium is put in; a blade attached to a rotary shaft which is mounted along the central axis of the container, for applying a shear force to the blasting medium when the blade is rotated; a first shearing plate attached to an inner surface of the container for applying a shear force to the blasting medium between the rotating blade and the first shearing plate; an annular horizontal plane fixed to a lower opening of the container; a rotary plate which is attached to the rotary shaft, and is disposed opposite to the horizontal plane with a predetermined space therebetween; a second shearing plate attached to the rotary plate; and a rotation drive section for driving the blade and the rotary plate for rotation via the rotary shaft.

6 Claims, 3 Drawing Sheets

BLASTING MEDIUM PICKING-APART DEVICE

BACKGROUND OF THE INVENTION

1. Field of the Invention

The present invention relates to a blasting medium picking-apart device, in particular, to a blasting medium of sponge fragments formed of abrasives stuck within a porous elastic body.

2. Description of the Related Art

Blasting is required as a pre-construction work in recoating a coated wall, and includes grinding the coating on the wall surface and roughening the coated surface for a surface preparation.

Such blasting work is performed by a sand blasting method such as that described in Japanese Patent Application Laid-Open No. 9-109029. Sand blasting is a construction method including the steps of hurling jetting sands (sands: blast materials) from a nozzle by using high speed air to impinge hit against them to a coated surface, and grinding and roughening a coated film on the coated surface with the impulsive force of the sands.

However, the sand blasting had a problem that the blast materials are bounced back with a strong force, which spreads coarse particulates in all directions. There is another problem that a worker who operates a nozzle has to be heavily covered up with wears to protect himself/herself from the blast materials which are bounced back with a strong force, and this affects the workability. Moreover, the spreading coarse particulates block the view of a worker, which makes it difficult to form a coating with a uniform quality.

As solutions to these problems, conventionally, a construction method which uses a blasting medium of sponge fragments formed of abrasives stuck within a porous elastic body, a so-called sponge blasting, has been known.

According to the sponge blasting, blasting medium are jetted from a nozzle by using high speed air to hit against a coated surface, the blasting medium becomes flat, which causes the abrasives attached to the blasting medium to directly hit against the coated surface at a high speed. This enables the grinding and removing a coated film on the surface to be achieved, as in the sand blasting. In the sponge blasting, the coarse particulates, which are otherwise airborne, are drawn into the sponge and fall down with the sponge, thereby advantageously the spreading of coarse particulates is reduced. Furthermore, there is another advantage that the sponge absorbs the bounce, and this considerably reduces the coarse particulates which bounce back, and a worker who operates a nozzle do not have to be heavily covered up with wears.

Japanese Patent Application Laid-Open No. 2002-28466 discloses a coated fertilizer treatment apparatus for stirring and dispersing granular solid particles by using a porous plate and two rotary vanes including an upper vane and a lower vane.

SUMMARY OF THE INVENTION

Meanwhile, since a blasting medium of sponge fragments tends to absorb moisture due to the characteristics of sponge, this type of blasting medium has a feature a plurality of blasting medium aggregate into clumps with the moisture. So, a blasting medium of sponge fragments which have been stored to reuse, or new blasting medium of sponge fragments which are just taken out of a bag are often found to be aggregated into clumps, resulting in that these media cannot be put in a sponge blasting apparatus as it is.

However, since there has not been any apparatus to loosen and break up pick apart the aggregated sponge blasting medium into pieces so far, the aggregated sponge blasting medium are manually picked apart and put into a sponge blasting apparatus.

The present invention was made in view of the above situation, and one object of the present invention is to provide a blasting medium picking-apart device for loosening and picking apart blasting medium which aggregate into clumps into pieces.

A first aspect of the present invention provides, in order to achieve the above object, a blasting medium picking-apart device, comprising: a hopper-shaped container having an upper opening through which blasting medium is put in; a blade attached to a rotary shaft mounted along the central axis of the container, for applying a shear force to the blasting medium when the blade is rotated; a first shearing plate attached to an inner surface of the container for applying a shear force to the blasting medium between the rotating blade and the first shearing plate; an annular horizontal plane fixed to the lower opening of the container; a rotary plate which is attached to the rotary shaft, and is disposed opposite to the horizontal plane with a predetermined space therebetween; a second shearing plate attached to the rotary plate; and a rotation drive section for driving the blade and the rotary plate for rotation via the rotary shaft.

According to the first aspect of the present invention, in a hopper-shaped container, a blade, a first shearing plate, and a second shearing plate of the hopper-shaped container apply a shear force to aggregated blasting medium which are put into the hopper-shaped container so as to loosen and pick apart the blasting medium into smaller pieces. According to the picking-apart device, a rotation of the blade driven by a rotation drive section produces a shear force between the rotating blade and the fixed first shearing plate, and the aggregated blasting medium in the container are roughly smashed by the shear force. The clumps of the roughly smashed blasting medium fall through the lower opening of the container onto a rotary plate, so as to be delivered to the outer peripheral part of the rotary plate by a centrifugal force of the rotary plate. Then the aggregated blasting medium are picked apart into smaller clumps by a shear force which is applied by the rotating second shearing plate, and are pushed into a narrow gap between a horizontal plate at the lower opening of the container and the rotary plate, to be loosened and be picked apart into pieces of each blasting medium. The separated blasting medium fall from the gap to be supplied to a blasting apparatus. In this way, according to the present invention, blasting medium which are aggregated into clumps can be loosened and broken up picked apart into pieces to be supplied to a blasting apparatus.

A second aspect of the present invention provides the blasting medium picking-apart device according to the first aspect, further comprising: a gap adjustment section for adjusting a gap between the horizontal plate and the rotary plate; and a control section for controlling the gap adjustment section based on a torque of the rotary shaft which is changed by the rotation drive section.

According to the second aspect of the present invention, a control section detects a torque of a rotary shaft which is changed by the rotation drive section, and controls the gap adjustment section to adjust a gap between the horizontal plate and the rotary plate so that the detected torque fall within a torque range which allows the blasting medium to be picked apart into pieces. That is, when the detected torque is below the torque range, the control section narrows the gap to increase the effect of the loosening action. While, when the detected torque is above the torque range, the control section widens the gap to return the torque to be within the range, but when the detected torque considerably goes beyond the torque range, the control section determines that there occurs a clogging, and stops the operation of the rotation drive section.

A third aspect of the present invention provides the blasting medium picking-apart device according to the second aspect, wherein the control section detects a change of a torque of the rotary shaft based on a motor current value of the rotation drive section, and controls the gap adjustment section to adjust the gap so that the motor current value falls within a predetermined range.

According to the third aspect of the present invention, the control section detects a torque of the rotary shaft based on a motor current value of the rotation drive section, which makes it possible to detect a minute change of the torque, and to prevent a motor failure due to an excess current value in advance. The control section controls the torque to a higher level based on the current value of the blade turning motor 118 within a range (when the loosening action requires power), but when the current value goes beyond the range, the control section reverses and drive controls within a normal current value range.

A fourth aspect of the present invention provides the blasting medium picking-apart device according to any one of the first to third aspects, wherein the rotary shaft is provided with a plurality of the blades which are separated by an adjustable distance.

According to the fourth aspect of the present invention, the levels and the number of the blades, and a distance between the blades can be adjusted in accordance with a size or volume of the aggregated blasting medium, and so, blasting medium in any form can be separated into fractions.

According to a blasting medium picking-apart device of the present invention, blasting medium which are aggregated into clumps can be loosened and picked apart into pieces.

DETAILED DESCRIPTION OF THE PREFERRED EMBODIMENTS

Now, with reference to the accompanying the drawings, preferred embodiments of a blasting medium picking-apart device according to the present invention will be explained in detail below.

Figure 1:
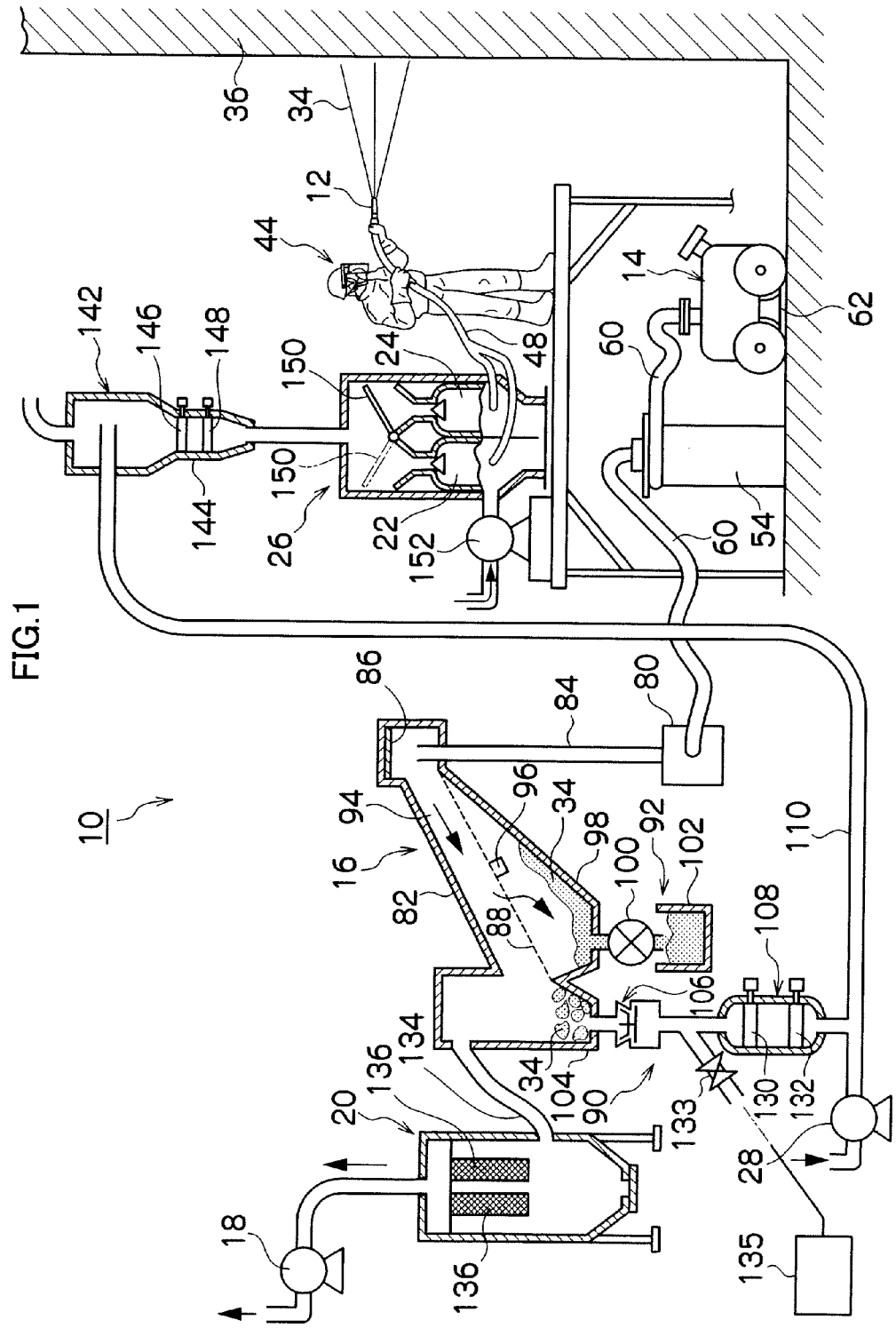
FIG. 1 is a view showing the entire structure of a sponge blasting apparatus.

FIG. 1 is an illustrative view showing the entire structure of a sponge blasting apparatus 10 to which an embodiment of a blasting medium picking-apart device is applied.

The sponge blasting apparatus 10 includes a nozzle 12 for jetting sponge shaped blasting medium, a self-propelled collecting device self-propelled recovering device 14 for sucking and collecting the blasting medium jetted from the nozzle 12, a solid-gas separating tank 16 for separating blasting medium sucked and collected by the self-propelled recovering device 14 into reusable blasting medium and unreusable blasting medium; a blower 18 for applying a suction power to the self-propelled recovering device 14 via the solid-gas separating tank 16, a bag filter 20 for removing dust in the air exhausted from the solid-gas separating tank 16 by the suction power from the blower 18, a continuous feeding device 26 which has at least two tanks 22 and 24 to store the reusable blasting medium separated by the solid-gas separating tank 16, the apparatus alternately switching between the two tanks 22 and 24 and continuously supplying the blasting medium stored in the tanks 22 and 24 to the nozzle 12, and a blower 28 for driving the reusable blasting medium separated by the solid-gas separating tank 16 to the continuous feeding device 26 by air.

First, sponge blasting by using the sponge blasting apparatus 10 will be explained.

The construction method uses blasting medium 34 which includes sponge having abrasives fixedly attached thereto, the abrasives being of different materials (steel grit, alumina, starlite, urea resin, and the like) depending on applications, and the blasting medium 34 are jetted to a coated film on a target object 36 to process by using high pressure air in order to grind the coated film and roughen the coated surface for surface preparation.

According to the sponge blasting, upon the hitting against to a coated film, the blasting medium 34 flattens to cause the abrasives fixedly attached thereto to directly hit against the coated film at a high speed. This allows the coated film to be ground as in sand blasting. Also, the coarse particulates, which are otherwise airborne, are drawn into the sponge and fall down with the sponge, thereby the spread of coarse particulates can be prevented. Also the bounce is absorbed by the sponge, resulting in an extremely reduced bouncing back of the blasting medium 34.

The solid-gas separating tank 16 includes a sucking section 80 coupled to a sucking hose 60 of the self-propelled recovering device 14, a vertically rising pipe 84 which is mounted in a vertical direction for connecting the sucking section 80 and the tank body 82, an urethane plate 86 which is disposed opposite to the upper opening of the vertically rising pipe 84, a sieve 88 for separating the blasting medium 34 into reusable blasting medium and unreusable blasting medium by vibration after the blasting medium 34 hit against the urethane plate 86, are decelerated, and fall onto the sieve, a take-out device 90 for discharging the reusable blasting medium 34 separated by the sieve 88, and a take-out device 92 for discharging the unreusable blasting medium 34 separated by the sieve 88.

After being sucked through the sucking hose 60, the used blasting medium 34 are introduced into the sucking section 80 which is an entrance of the solid-gas separating tank 16, and in the sucking section 80, relatively large dust which is sucked with the blasting medium 34 is separated by a mesh (not shown) which is built in the sucking section 80. The blasting medium 34 which passed the mesh is driven upward in the vertically rising pipe 84 by a suction power of the blower 18 (for example, −47 kPa, 30 m$^3$/min, 30 kW), is decelerated, and is jetted upward through the opening of the vertically rising pipe 84. Then the blasting medium 34 hits against the urethane plate 86, is further decelerated, and is supplied into a gas-solid separation chamber 94 in the tank body 82 which has a relatively large volume. Now, the blasting medium 34 have a terminal velocity or less to go into free fall, and falls onto the sieve 88 which is mounted to the gas-solid separation chamber 94.

The sieve 88 is set to have an inclined angle which is the most appropriate in accordance with various conditions such as a suction power of the blower 18. Generally at the center of the lower surface of the sieve 88, there is provided a pressurized air-driven vibrator 96 for vibrating the entire sieve 88. Thus, the unreusable blasting medium 34 among the blasting medium 34 which fell onto the sieve 88 pass through the vibrated sieve 88, and fall into the hopper-shaped reservoir 98 to be stored there. The unreusable blasting medium 34 are discharged to a trash box 102 when a rotary feeder 100 coupled to the hopper-shaped reservoir 98 is driven.

Meanwhile, the reusable blasting medium 34 among the blasting medium 34 which fell onto the sieve 88 do not pass through the vibrated sieve 88, but run downward along the vibrated sieve 88, and slide down into the hopper-shaped reservoir 104 which is disposed downstream of the tank body 82, to be stored therein.

The blasting medium 34 stored in the hopper-shaped reservoir 104 aggregate into clumps due to its own moisture, and cannot be supplied to the continuous feeding device 26 as they are. So, in the embodiment, the blasting medium 34 are to fall into a picking-apart device 106 which forms the takeout device 90, to be loosened and picked apart into pieces there. After being loosened and picked apart into pieces by the picking-apart device 106, the blasting medium 34 are supplied to a positive-pressure feed pipe 110 via a double damper 108, and is driven toward the continuous feeding device 26 by compressed air of the blower 28 which is coupled to the positive-pressure feed pipe 110.

Figure 2:
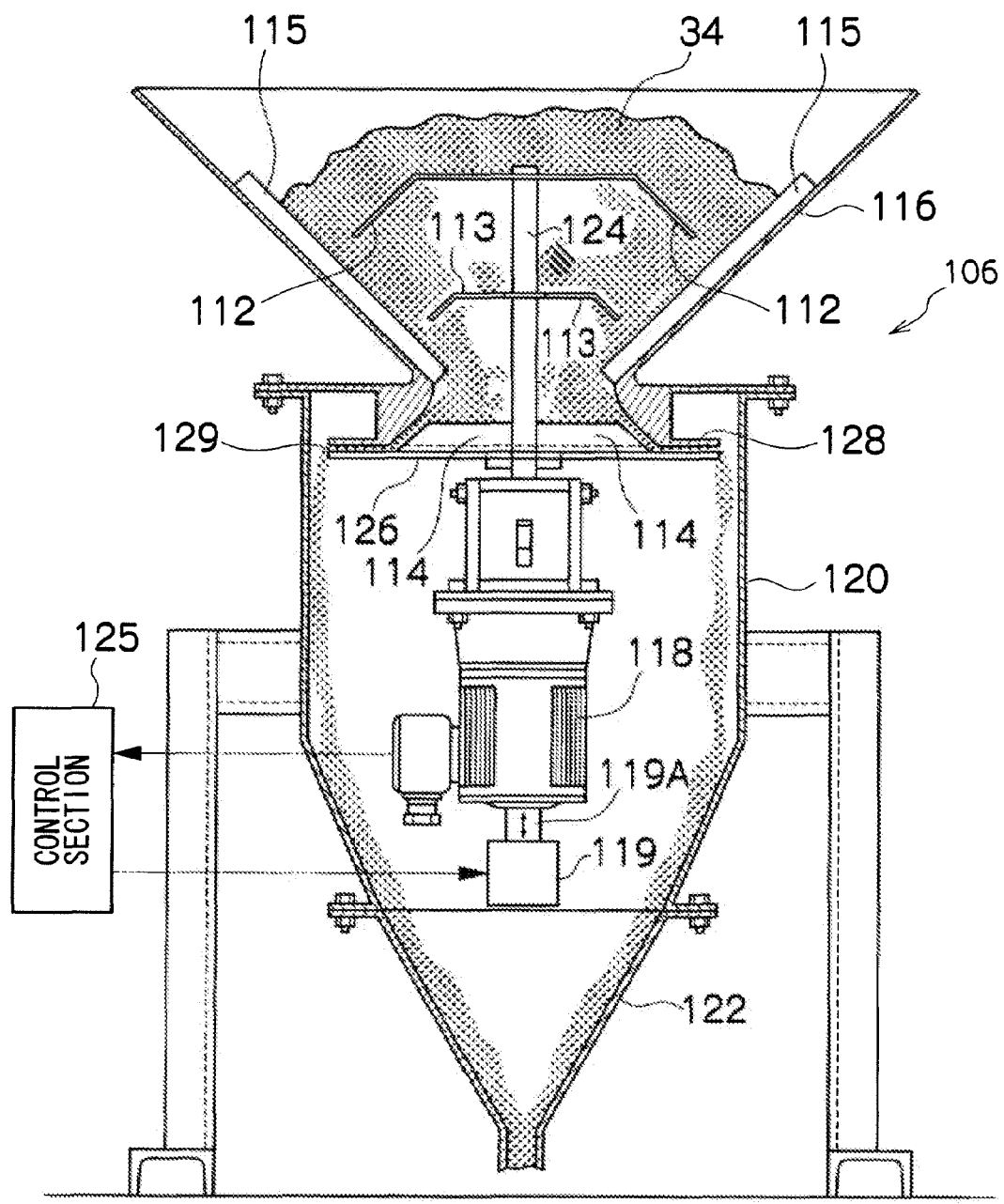
FIG. 2 is a longitudinal sectional view showing a picking-apart device which is applied to the sponge blasting apparatus of FIG. 1.
Figure 3:
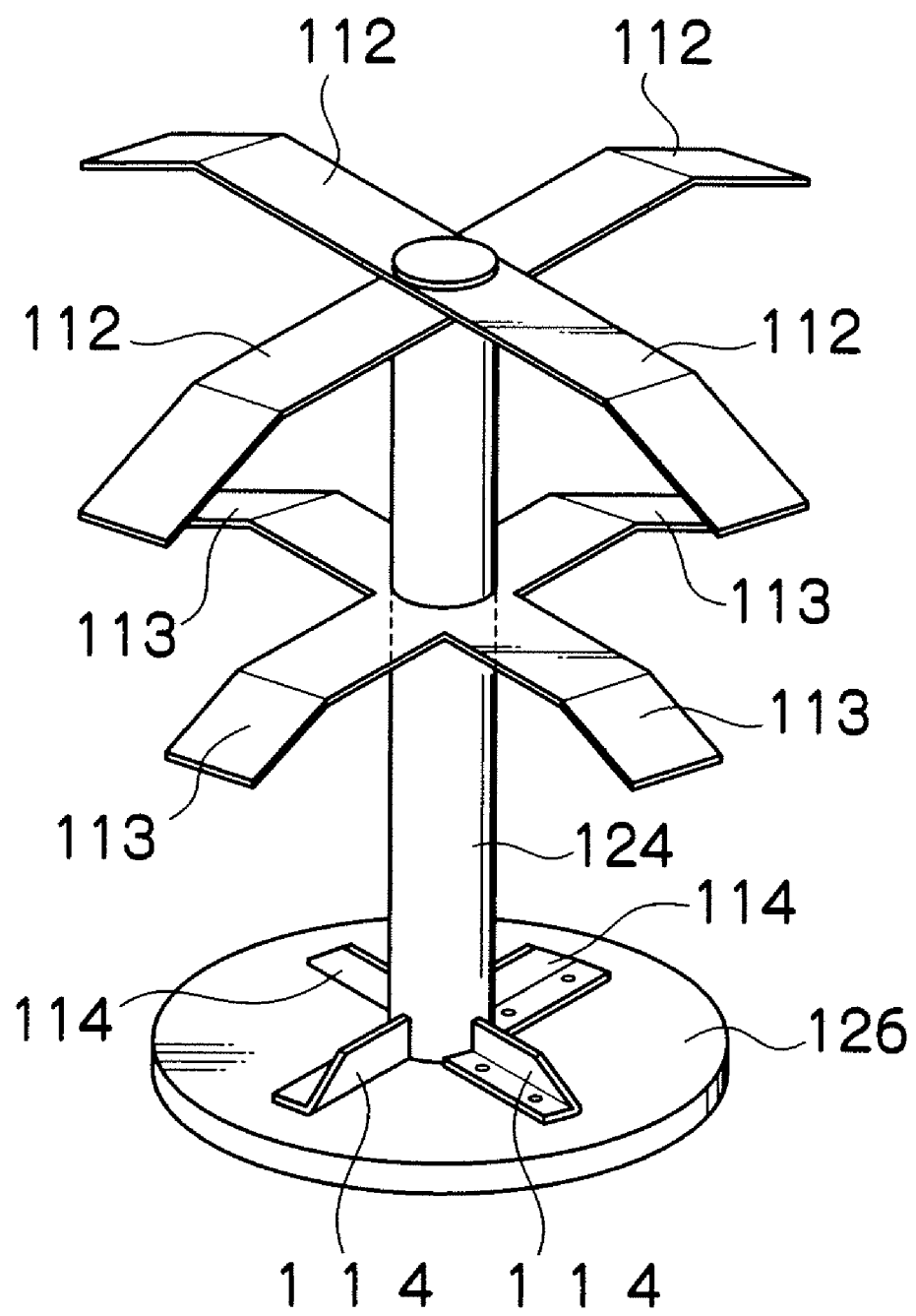
FIG. 3 is a perspective view showing a blade structure of the picking-apart device of FIG. 2.

FIG. 2 is a longitudinal sectional view showing an embodiment of a picking-apart device 106. The picking-apart device 106 loosens and picked apart the blasting medium 34, which have been stored in the hopper-shaped reservoir 104 and aggregated into clumps, into pieces of each blasting medium 34, by applying a shear force from upper and lower two-level blades 112 and 113, a shearing plate (first shearing plate) 114, and a shearing plate (second shearing plate) 114 of FIG. 3.

The picking-apart device 106 includes: an upper hopper (container) 116 coupled to the hopper-shaped reservoir 104 of the solid-gas separating tank 16 into which the aggregated blasting medium 34 fall through the upper opening thereof; a cylindrical main body section 120 coupled to the lower part of the upper hopper 116 and in which a blade turning motor (rotation drive section) 118 and an air spring type actuator (gap adjustment section) 119 are installed; and a lower hopper 122 coupled to the lower part of the main body section 120 which has a lower part coupled to the double damper 108. The upper hopper 116 has an inner surface which is configured to have an angle of repose, and a plurality of shearing plates 115 are fixed to the inner surface. The gap adjustment section is not limited to the air spring type actuator 119, and any device may be used as far as it causes the blade turning motor 118 to move upward and downward along a guide which is disposed in a vertical direction by using a drive device such as a cylinder and a motor.

The blade turning motor 118 is secured to a movable portion 119A of the air spring type actuator 119 which is fixed to the main body section 120. The blade turning motor 118 includes a spindle (rotary shaft) 124 having a top end to which four blades 112, 112 . . . are fixed, a middle part to which four blades 113, 113 . . . are fixed, and a lower end to which a disc (rotary plate) 126 is fixed, the disc 126 having four L-shaped shearing plates 114, 114 . . . fixed thereto.

Therefore, according to the picking-apart device 106 having a configuration as described above, a rotation of the blades 112 and 113 and the shearing plates 114 driven by the blade turning motor 118 at about 50 rpm produces a shear force between the rotating blades 112 and 113 and the shearing plates 115, and by the shear force the aggregated blasting medium 34 which have a side size of 100 to 200 mm for example and fall in the upper hopper 116 are roughly smashed into smaller clumps having a diameter of 30 to 50 mm.

Then, the clumps of the roughly smashed blasting medium 34 fall onto the rotating disc 126 through the lower opening of the upper hopper 116, and are delivered to the outer peripheral part of the disc 126 by the centrifugal force of the disc 126.

At the outer peripheral part, the aggregated blasting medium 34 are finely separated by the shear force applied from the rotating shearing plate 114, and are pushed into a narrow gap 129 between the disc 126 and an annular flange (horizontal plate) 128 which is disposed at the lower opening of the upper hopper 116, to be loosened and be picked apart into pieces of each blasting medium 34. This action allows the aggregated blasting medium 34 to be separated to have its original size.

Then the separated blasting medium 34 fall through the gap to be supplied to the double damper 108 via the lower hopper 122. This eliminates a supply of the aggregated blasting medium 34 to the continuous feeding device 26, but only the blasting medium 34 which are picked apart into pieces of each blasting medium 34 are supplied to the continuous feeding device 26, thereby troubles such as a clogging of the positive-pressure feed pipe 110, the continuous feeding device 26, or the nozzle 12 due to the aggregated blasting medium 34 can be prevented.

The current value of the blade turning motor 118 is detected by the control section 125, and the control section 125 includes a calculating section for calculating a change in the current value into a torque change of the spindle 124. The control section also stores a data of torques (torques within a certain range) of the spindle which correspond to the torques for picking apart the blasting medium into pieces, and causes the air spring type actuator 119 to control the height position of the disc 126 relative to the flange 128 to form the gap 129 of 8 mm for example therebetween so that the calculated (detected) torque falls in the torque range. That is, when the calculated torque is below the torque range, the control section 125 narrows the gap 129 to increase the effect of the loosening action. When the calculated torque is above the torque range, the control section 125 widens the gap 129 to return the torque to within the torque range. Also, when the detected torque considerably goes beyond the torque range, the control section 125 determines that there occurs a clogging of the gap 129, and stops the operation of the blade turning motor 118. Moreover, the control section 125 controls the torque to a higher level based on the current value of the blade turning motor 118 within a range (when the loosening action requires power), but when the current value goes beyond the range, the control section 125 reverses and drive controls within a normal current value range.

The levels and the numbers of the blades 112 and 113 are not limited to two and four respectively, and may be three or more, and five or more respectively. The distance between the blades 112 and 113 may be conveniently set depending on the type of the blasting medium 34 and the like. This flexibility in configuration allows any form of blasting medium to be picked apart into pieces.

In FIG. 2, the picking-apart device 106 is used for the reusable blasting medium 34, but the use of the picking-apart device 106 is not limited to that, and the picking-apart device 106 may be applied to the loosening of new blasting medium 34 (aggregated into clumps) which are just taken out of a bag (plastic bag containing 18 kg).

The double damper 108 blocks the solid-gas separating tank 16 which is set under a negative pressure and the positive-pressure feed pipe 110 which is set under a positive pressure, and includes an upper damper 130 and a lower damper 132.

These dampers 130 and 132 are normally held at closed position, but the damper 130 is opened when the picking-apart device 106 is driven and a predetermined amount of the blasting medium 34 which are picked apart into pieces are stored. The opening of the damper 130 allows the blasting medium 34 to fall onto the damper 132 and be stored there. Next, the dampers 130 is closed and the damper 132 is opened, which allows the blasting medium 34 to fall into the positive-pressure feed pipe 110, and to be driven toward the continuous feeding device 26 by the compressed air from the blower 28. At the time of point when all of the blasting medium 34 on the damper 132 fall into the positive-pressure feed pipe 110, the damper 132 is closed. This operation is repeated so that the blasting medium 34 which are reusable and are picked apart into pieces can be supplied toward the continuous feeding device 26.

Among the blasting medium 34 which fall from the picking-apart device 106, when the valve 133 is opened, a part of the blasting medium 34 are fed into a particle size measuring apparatus 135 for measuring of a particle size.

Meanwhile, as shown in FIG. 1, the blower 18 exhausts the air in the solid-gas separating tank 16 by using its suction power, and the exhausted air is introduced from the solid-gas separating tank 16 into a bag filter 20 via a duct 134. The exhausted air passes through the filters 136 of the bag filter 20 so that the particle dust of the blasting medium and other dust contained therein is removed to be released in the atmosphere.

The blasting medium 34, after being driven to the positive-pressure feed pipe 110 by air, enters in a cyclone separator 142 which is disposed upstream of the continuous feeding device 26 so that the air contained in the blasting medium 34 is separated.

The blasting medium 34 without air are supplied to the continuous feeding device 26 via the double dampers 146 and 148 which are provided to the lower hopper 144 of the cyclone separator 142.

The continuous feeding device 26 includes: two storage tanks 22 and 24; a switching valve 150 for guiding the blasting medium 34 from the cyclone separator 142 to be fed into one of the two tanks 22 and 24; and a blower 152 for alternately switching the two tanks 22 and 24 to continuously supply the blasting medium 34 stored in the tank 22 (24) to the nozzle 12.

What is claimed is:

1. A blasting medium picking-apart device comprising:
   a hopper-shaped container having an upper opening through which a blasting medium is put in;
   at least one blade attached to a rotary shaft which is mounted along the central axis of the container, for applying a shear force to the blasting medium when the blade is rotated;
   at least one first shearing plate attached to an inner surface of the container for applying a shear force to the blasting medium between the at least one rotating blade and the at least one first shearing plate;
   an annular horizontal flange plate fixed to a lower opening of the container;
   a rotary plate which is attached to the rotary shaft, and is disposed opposite the horizontal flange plate with a predetermined gap therebetween;
   at least one second shearing plate attached to the rotary plate; and
   a rotation drive section for driving the at least one blade and the rotary plate for rotation via the rotary shaft.

2. The blasting medium picking-apart device according to claim 1, further comprising:
   a gap adjustment section for adjusting the gap between the horizontal flange plate and the rotary plate; and
   a control section for controlling the gap adjustment section based on a torque of the rotary shaft which is changed by the rotation drive section.

3. The blasting medium picking-apart device according to claim 2, wherein
   the rotary shaft is provided with a plurality of blades which are separated by an adjustable distance.

4. The blasting medium picking-apart device according to claim 2, wherein
   the control section detects a change of a torque of the rotary shaft based on a motor current value of the rotation drive section, and controls the gap adjustment section to adjust the gap so that the motor current value falls within a predetermined range.

5. The blasting medium picking-apart device according to claim 4, wherein
   the rotary shaft is provided with a plurality of blades which are separated by an adjustable distance.

6. The blasting medium picking-apart device according to claim 1, wherein
   the rotary shaft is provided with a plurality of blades which are separated by an adjustable distance.

\* \* \* \* \*